Patented June 5, 1934

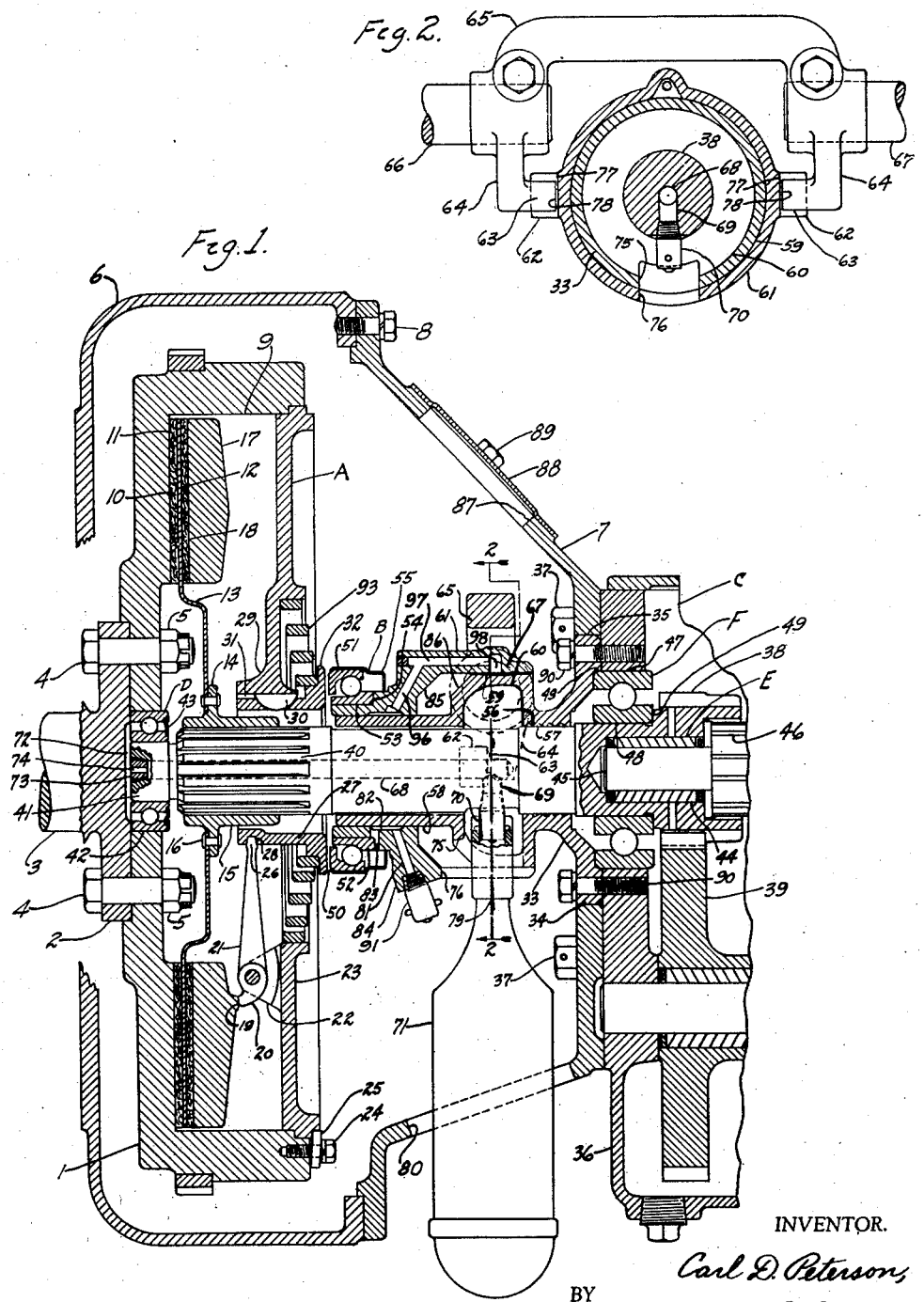

1,961,568

UNITED STATES PATENT OFFICE 1,961,568

CLUTCH MECHANISM

Carl D. Peterson, Toledo, Ohio, assignor to Spicer Manufacturing Corp., Toledo, Ohio, a corporation of Ohio Application April 2, 1932, Serial No. 602,645

19 Claims. (Cl. 192—113)

My invention relates to improvements in means for lubricating the clutch pilot bearings in the clutch mechanism of unit power plants of automotive vehicles; and the objects of my improvements are, first, to provide means for lubricating a clutch pilot bearing of the unit power plant of an automotive vehicle, said means being independent of the lubrication system of the transmission thereof; second, to provide a system for lubricating a clutch pilot bearing of the unit power plant of an automotive vehicle, said system comprising means for introducing the lubricant through the clutch housing and the drive shaft of the unit power plant, third, to provide means for attaching a lubricant gun to a revolvable shaft located within a plurality of housings; fourth, to provide a clutch throwout bearing support bracket having an opening for the insertion therethrough of a lubricant gun; and fifth, to provide a clutch mechanism having a plurality of housings each provided with an aperture aligned with a lubricant connection.

I attain these objects by the mechanism illustrated in the accompanying drawing, in which—

Figure 1 is a vertical section through a clutch assembly equipped with my clutch mechanism; and Fig. 2, a vertical section on the line 2—2, Fig. 1.

Similar numerals refer to similar parts throughout the several views.

The flywheel 1 is attached to the flange 2 of the crankshaft 3 of an engine for an automotive vehicle, the flywheel 1 being secured by the bolts 4 and the nuts 5. The flywheel 1 is enclosed by the bell housing 6, of the engine, to which is attached the clutch housing 7 by the screws 8. The flywheel 1 is provided with the chamber 9 in which operates the clutch assembly A. The flywheel 1 is provided with the friction face 10 which is engaged by the friction member 11 which together with the friction member 12 are suitably attached to the driven disc 13 which is in turn secured to the flange 14 of the hub 15 by the rivets 16. The thrust member 17 is provided with the friction face 18 for engaging the friction member 12. The thrust member 17 is provided with suitable cam surfaces 19 which are engaged by the arm 20 of the lever 21 which is pivotally mounted in the boss 22 of the cover member 23 which is suitably attached to the flywheel 1 by the screws 24 and the clamp member 25.

The levers 21, of which only one is disclosed, are engaged, at their inner ends 26 by the sleeve 27, the inner ends 26 of the levers 21 engaging the groove 28 of the sleeve 27. The sleeve 27 is slidably mounted in a boss portion 29 of the cover member 23, the sleeve 27 being restrained from turning by the key 30 which slides in the keyway 31 of the boss portion 29, the boss portion 29 being suitably cut away to permit the inner ends of the levers 21 to engage the groove 28 of the sleeve 27. The sleeve 27 is provided with the flange 32 which engages the bearing assembly B. The spring 33 engages the cover member 23 and the forward face of the flange 32 of the sleeve 27, thus always tending to move the sleeve 27 to the right, as viewed in Fig. 1, this in turn tending to move the inner ends 26 of the levers 21 to the right which, in turn, tend to cause the arms 20 of the levers 21 to force the thrust member 23 to the left, the clutch assembly A thus being operated to an engaged position as disclosed in Fig. 1.

The housing 33 is provided with a flange 34 which fits within the bore 35 of the clutch housing 7 and is secured to the transmission housing 36 of the transmission assembly C by the screws 90. It will thus be noted that when the transmission housing 36 is fastened to the clutch housing 7 by the screws 90 the transmission assembly C together with the housing 33 will be concentrically located relative to the clutch assembly A, together with the flywheel 1, the crankshaft 3, the bell housing 6, the clutch housing 7 and the hub 15.

The transmission assembly C is provided with the drive gear 38 which engages the countershaft gear 39, the drive gear 38 being provided with the splines 40 which engage the hub 15, the hub 15 being slidably mounted on the splines 40. The drive gear 38 is further provided with the extension portion 41 which is supported in the bearing assembly D, which is ordinarily known as a clutch pilot bearing, and is, in turn, supported within the bore 42 of the flywheel 1. The bearing assembly D is assembled into the bore 42 and on the extension portion 41 with a slight press fit. The bearing assembly D may be provided with the retainer 43 which will prevent the lubricant that has been delivered, as hereinafter disclosed, to the bearing assembly D from flowing out of the bearing assembly D.

The drive gear 38 is provided with the chamber 44 in which is mounted the bearing assembly E which supports the end 45 of the main shaft 46 of the transmission assembly C. The drive gear 38 is supported by the bearing assembly F which is suitably mounted in the bore 47 of the transmission housing 36 and on the shaft portion 48 and against the shoulder 49 of the drive gear 38, the bearing assembly F being further mounted concentrically within the recess 49 of the housing 33. When the clutch assembly A is in its engaged position, as disclosed in Fig. 1, a clearance space 50 will always exist between the face of the flange 32 of the sleeve 37 and the ball race 51 of the bearing assembly B. The ball race 52 is pressed on the portion 53 and against the shoulder 54 of the sleeve member 61 and the ball race 51 together with the retainer 55 are freee to turn when the ball race 51 engages the flange 32 of the sleeve 27 when the sleeve 27 is revolving with the clutch assembly A.

The housing 33 is provided with the oil return threads 56 which fit closely around the portion 57 of the drive gear 38 and prevents the seepage or flow of any lubricant from the transmission assembly C along the drive gear 38 to the left. It is to be noted that the drive gear 38 is supported by the bearing assembly F and D and extends concentrically through the housing 33. The housing 33 is provided with the extension portion 58 which together with the outside surface 59 of the wall of the chamber 60 form double bearings upon which is slidably mounted the sleeve member 61 which suppports the ball race 52. The sleeve member 61 is provided with bosses 62 against which contact the rounded portions 63 of the arms 64 of the yoke member 65 which is suitably connected with and mounted on the shafts 66 and 67 which may, in turn, be mounted in bosses (not shown) in the clutch housing 7.

It will thus be noted that when the shafts 66 and 67 together with the arm 64 are rotated clockwise, as viewed in Fig. 1, by suitable pedal and lever mechanism (not shown), the rounded portions 63, of the arms 64, will engage the bosses 62, of the sleeve member 61, and move the sleeve member 61 together with the bearing assembly B to the left, the ball race 51 engaging the face of the shoulder 32, this causing the sleeve 27 to compress the spring 93 and to move the inner ends 26 of the levers 21 to the left which will allow the thrust member 17 together with the thrust surface 10 of the flywheel 1 to become disengaged from the friction members 11 and 12.

It is to be especially noted that the lubricant which will be placed in the transmission housing 36 will effectively be prevented, by the oil return threads 56, from flowing along the drive gear to the left and in order to provide means of lubricating the bearing assembly D, I have provided the hole 68 in the drive gear 38, the hole 68 extending from the end of the extension portion 41 to a point adjacent the chamber 60 of the housing 33. The hole 69 may be drilled approximately at right angles to and connecting with the hole 68, the outer end of the hole 69 being threaded to receive the connection 70 which may be of any desired type to permit a high pressure lubricant gun, such as indicated at 71, to be operatively connected therewith.

The crankshaft 3 may be provided with the recess 72 which will not only provide a passage of the lubricant from the hole 68 to the rollable members of the bearing assembly D but may also provide a reservoir chamber for permitting a larger body of lubricant to be retained adjacent the bearing assembly D. When desired, the end of the hole 68 may be partially closed by the threaded member 73, the threaded member 73 being provided with the hole 74 therethrough to permit the required size of passage for the lubricant.

It is to be noted that the connection 70 will be free to revolve, with the drive gear 38, the connection 70 being provided with the necessary clearance space by the chamber 60 of the housing 33.

The housing 33 is provided with the opening 75 at its lower side, the opening 75 being in alignment with the opening 76 in the lower part of the sleeve member 61. It is also to be noted that the openings 75 and 76 will be always maintained in alignment with each other because the housing 33 is stationary and the sleeve member 61 can only move longitudinally of the housing 33, the sleeve member 61 being prevented from revolving by the surfaces 77 engaging the end surfaces 78 of the rounded portions 63 of the arms 64 of the yoke member 65, the opening 76 of the sleeve member 61 being of sufficiently longer length than the length of the opening 75 of the housing 33 so as to always provide an aligned open portion of sufficient area to permit the entrance of the nozzle 79 of the gun 71. Also the opening 76 of the sleeve member 61 may extend to the right to the extreme end of the sleeve member 61, as disclosed in Fig. 1, to always permit of the proper area of opening in alignment with the opening 75 of the housing 33.

It is also to be noted that the opening 80, in the lower side of the clutch housing 7, will also always be in approximate alignment with the openings 75 and 76 to permit the insertion and connecting of the gun 71 in its operative position as disclosed in Fig. 1.

The sleeve member 61 may be further provided with the passage 81 to which may be connected the lubricant connection 82 which is similar to the connection 70. The passage 81 connects with the chamber 82, of the sleeve member 61, the passage 83 connecting the chamber 82 with the operating space of the rollable members of the bearing assembly B. The passages 96, 97, and 98 further connect the chamber 82 with the bearing surface 59 and permits lubricant to be forced to the bearing surface 59 when lubricant is being forced through the passages 81 and 83 as hereinafter disclosed. The sleeve member 61 is provided with the boss 84 for receiving the connection 82, the extension portion 58, of the sleeve member 61, being connected with its enlarged portion, fitting over the outside surface 59 of the housing 33, by means of the inclined annular wall portion 85 which conforms to the location of the boss 84 and also permits movement of the sleeve member 61 to a point adjacent the angular surface 86 of the housing 33.

The upper opening 87 of the clutch housing 7 may be closed by the cover 88, secured by the screws 89. It is to be readily noted that, with my invention, the nozzle 79 of the lubricant gun 71 may be inserted through the opening 80 of the clutch housing 7, through the opening 76 of the sleeve member 61, and through the opening 75 of the housing 33, to a point where the nozzle 79 may be operatively connected to the lubricant connection 70. As the gun 71 is now operated, in the usual way, lubricant under pressure will be forced from the gun 71 through the passage 69, the passage 68, the passage 74, and through the chamber 72 to the operating space of the rollable members of the bearing assembly D. It is to be noted that the connection 70 can be located in alignment with the openings 75 and 76 by revolving the drive gear 38, by means of the engine and the clutch assembly A, and noting the stopping position of the connection 70 relative to the openings 75 and 76.

In a similar way, the nozzle 70 may be operatively connected with the lubricant connection 91, the lubricant then being forced under pressure from the gun 71, through the passage 81, the chamber 82, and the passage 83 to the operating space of the rollable members of the bearing assembly B.

I claim:

1. In a clutch mechanism, the combination of a flywheel, a bearing in said flywheel, a shaft supported in said bearing, said shaft being provided with a passage throughout a portion of its length, said shaft being further provided with a passage connecting its outer surface with the passage extending throughout a portion of its length, said shaft being revolvably mounted, a housing enclosing a portion of said shaft, said housing being fixedly mounted, said housing being provided with a chamber extending around said shaft, said housing being provided with an opening through its side wall, said housing being provided with a plurality of bearing diameters, a lubrication member suitably mounted in said shaft, said lubrication member being connected with the passage connecting the outer surfaces of said shaft with the passage extending throughout a portion of the length of said shaft, said lubrication member being adapted to revolve with said shaft in the chamber of said housing extending around said shaft, and a housing slidably mounted on the plurality of bearing diameters of said first mentioned housing, said last mentioned housing being provided with an opening in its side wall, the opening in the side wall of said last mentioned housing being in alignment with the opening in the side wall of said first mentioned housing.

2. In a clutch mechanism, the combination of a clutch housing, said housing being provided with an aperture, a housing suitably supported in said clutch housing, said last mentioned housing being provided with an aperture in alignment with the aperture of said clutch housing, and a slidably mounted housing on said last mentioned housing, said slidably mounted housing being provided with an aperture in alignment with the apertures of said clutch housing and said second mentioned housing, and a shaft suitably mounted within said clutch housing, said shaft being provided with a lubricant passage adapted for alignment with the apertures of said clutch housing, said second mentioned housing, and said slidably mounted housing.

3. In a mechanism comprising a clutch and a transmission, said clutch being provided with a clutch housing therearound, the combination of a revolvably mounted shaft, a housing suitably mounted on the transmission, said housing extending within said clutch housing, said housing surrounding said shaft, and a lubrication member suitably mounted in said shaft, said lubrication member being adapted to revolve within said last mentioned housing.

4. In a clutch mechanism including a main clutch housing, the combination of a revolvably mounted shaft, a lubrication member suitably mounted in said revolvably mounted shaft, and a housing suitably mounted, said housing surrounding said shaft and extending within said main clutch housing, said housing being provided with an aperture to permit access to said lubrication member together with a chamber to provide clearance for said lubrication member when revolving with said shaft.

5. In a clutch mechanism, the combination of a revolvably mounted shaft, a lubrication member suitably mounted in said revolvably mounted shaft, and a housing suitably mounted around said revolvably mounted shaft, said housing being provided with an annular chamber adjacent said lubrication member to permit said lubrication member to revolve therein with said shaft, said housing being further provided with an aperture in the wall of its annular chamber, the aperture of said housing being in alignment with said lubrication member.

6. In a clutch mechanism, the combination of a revolvably mounted shaft, a housing suitably mounted around said shaft, said housing being provided with a plurality of bearing diameters, a housing slidably mounted on the plurality of bearing diameters of said first mentioned housing, and a lubrication member in said revolvably mounted shaft, said lubrication member being located within said first mentioned and said second mentioned housings.

7. In a clutch comprising a shaft adapted to be connected with a lubricant gun, the combination of a plurality of housings each provided with an opening adapted to permit the insertion of the nozzle of the lubricant gun, and a housing enclosing said plurality of housings, said last mentioned housing being provided with an opening adapted to permit the insertion of the body of the lubricant gun.

8. In a clutch mechanism, the combination of three concentrically mounted housings, each provided with aligned openings, a revolvably mounted shaft within said housings, and a lubricant member suitably mounted in said shaft, said lubricant member being adapted for alignment with the aligned openings of said housings.

9. In a clutch mechanism, the combination of a shaft provided with a lubricant passage, a housing surrounding said shaft, said housing being provided with an aperture in alignment with the lubricant passage of said shaft, and a housing slidably mounted on said last mentioned housing, said housing being provided with an aperture in alignment with the lubricant passage of said shaft, the aperture of said slidably mounted housing having a greater length longitudinally of said shaft than the aperture of said first mentioned housing.

10. In a clutch mechanism, the combination of a fixed housing provided with a bore together with a chamber adjacent its bore, a housing slidably mounted on said first mentioned housing, said last mentioned housing being provided with a pair of annular portions of different diameter connected by an inclined annular wall, means for restraining said last mentioned housing from revolving, and a revolvably mounted shaft within said first mentioned housing, said revolvably mounted shaft being provided with a lubricant passage.

11. In a clutch mechanism, the combination of a revolvably mounted shaft, a lubrication member suitably mounted in said revolvably mounted shaft, and a housing suitably mounted around said revolvably mounted shaft, said housing being provided with a pair of bearing surfaces, said housing being provided with an annular chamber adjacent said lubrication member, said housing being further provided with an aperture in the wall of its annular chamber, a second housing slidably mounted on said first mentioned housing, said second mentioned housing being provided with passages for conducting lubricant to the pair of bearing surfaces of said first mentioned housing, and a lubricant member suitably connected with the passages of said second mentioned housing.

12. In a clutch mechanism, the combination of a housing provided with a pair of annular bearing surfaces, said housing being provided with a lubricant passage around one of its annular bearing surfaces, said housing being provided with a lubricant passage extending from its outside surface to the lubricant passage extending around one of its annular bearing surfaces, said housing being further provided with a lubricant passage extending from the lubricant passage around one of its annular bearing surfaces to the other of its annular bearing surfaces, and a lubricant connection suitably connected with the lubricant passage extending from the outside surface to the lubricant passage extending around one of the annular bearing surfaces of said housing.

13. In a clutch mechanism, the combination of a housing suitably mounted, said housing having an annular chamber, said housing being provided with a pair of bearing surfaces of different diameter one of said bearing surfaces being located on the wall of said annular chamber, a shaft extending through the annular chamber of said housing, and a second housing slidably mounted on the pair of bearing surfaces of said first mentioned housing, said second mentioned housing being provided with lubricant passages connecting with the pair of bearing surfaces of said first mentioned housing, a lubricant member in said shaft, said lubricant member being located in alignment with the annular chamber of said first mentioned housing, and a lubricant member connected with the lubricant passages connecting with the pair of bearing surfaces of said first mentioned housing.

14. In a clutch mechanism, the combination of a housing enclosing the clutch mechanism, said housing being provided with an opening in its side wall for receiving a lubricant gun therethrough, a second housing provided with a supporting flange, at one of its ends, for suitably mounting said second housing within said first mentioned housing, said second housing being provided with a bore therethrough together with an enlarged chamber located between the ends of the bore, said second housing being further provided with an opening through the side wall of its enlarged chamber, the opening of said second housing being in alignment with the opening in the side wall of said first mentioned housing, to permit the insertion of a lubricant gun therein, a shaft revolvably mounted within and extending through the bore of said second housing, said shaft being provided with a lubricant passage located in alignment with the enlarged chamber of said second housing, and lubricant means providing a connection between the lubricant passage of said shaft and a lubricant gun, said lubricant means being located within the enlarged chamber of said second housing.

15. In a clutch mechanism, the combination of three housings located concentrically relative to one another, one of said housings being adapted for movement longitudinally relative to the remaining two housings, each of said housings being provided with apertures in their side walls, said apertures being in alignment, and a shaft suitably mounted and extending through said three housings, said shaft being provided with a passage having a portion extending laterally of said shaft and in alignment with the apertures of said three housings.

16. In a clutch mechanism, the combination of a clutch main shaft suitably mounted and extending through the clutch, said clutch main shaft being provided with a lubricant passage extending from the inner end of the clutch main shaft to a point between the clutch and the outer end of the clutch main shaft, said clutch main shaft being further provided with a lateral lubricant passage extending from said first mentioned lubricant passage to the outside of the clutch main shaft at a point between the clutch and the outer end of said clutch main shaft, and a pair of housings suitably mounted around said clutch main shaft, one of said housings being slidably mounted on the other of said housings to operate the clutch, said housings being each provided with openings in their wall portions, said openings being in alignment with the lateral lubricant passage of said clutch main shaft to facilitate the introduction of lubricant into said lateral lubricant passage.

17. In a mechanism comprising a flywheel, a clutch, and a transmission, the combination of a bearing suitably mounted in the flywheel, a clutch main shaft suitably supported in the bearing in the flywheel and in the transmission, said clutch main shaft being provided with a passage extending longitudinally thereof from its end in the bearing in the flywheel to a point between the clutch and the transmission, and a lubricant gun connection suitably mounted in the clutch main shaft at a point between the clutch and transmission, said lubricant gun connection being connected with the passage extending longitudinally of the clutch main shaft.

18. In a clutch mechanism, the combination of a fixedly mounted housing provided with an annular chamber, a member slidably mounted on said fixedly mounted housing and adapted to operate the clutch to a disengaged position, a revolvably mounted member suitably mounted and extending through the annular chamber of said fixedly mounted housing, said revolvably mounted member being operatively connected with the clutch, said revolvably mounted member being provided with a lubricant passage extending from its inner end to a point on its outer surface, said point being located in alignment with the annular passage of said fixedly mounted housing, and lubricant means suitably mounted in and connected with the lubricant passage of said revolvably mounted member, said lubricant means extending within the annular chamber of said fixedly mounted housing.

19. In a clutch mechanism, the combination of a clutch main shaft revolvably mounted on a pair of bearings at the axis of the clutch, said clutch main shaft being provided with a passage for conducting lubricant to one of said bearings, a housing fixedly supported around said clutch main shaft, said housing being provided with an annular chamber extending around said clutch main shaft, said annular chamber being located between said pair of bearings, said annular chamber being provided with means permitting access thereinto, and a lubricant connection suitably mounted in said shaft, said lubricant connection being connected with the passage of said clutch main shaft, said lubricant connection being adapted to revolve, with said clutch main shaft, in the annular chamber of said housing.

CARL D. PETERSON.